US012686794B2

(12) United States Patent
Puthanparambil et al.

(10) Patent No.: US 12,686,794 B2
(45) Date of Patent: Jul. 21, 2026

(54) AMORPHOUS COPOLYESTER RESINS FOR USE AS A COLD SEAL ADHESIVE, COATING COMPOSITIONS

(71) Applicant: Bostik, Inc., Wauwatosa, WI (US)

(72) Inventors: Deepa Puthanparambil, Wauwatosa, WI (US); Tatiana Kretlow, Wauwatosa, WI (US); Joshua T. Harju, Wauwatosa, WI (US); Marie Hut, Wauwatosa, WI (US)

(73) Assignee: Bostik, Inc., Wauwatosa, WI (US)

( * ) Notice: Subject to any disclaimer, the term of this patent is extended or adjusted under 35 U.S.C. 154(b) by 41 days.

(21) Appl. No.: 18/032,598

(22) PCT Filed: Oct. 20, 2021

(86) PCT No.: PCT/US2021/055804
§ 371 (c)(1),
(2) Date: Apr. 19, 2023

(87) PCT Pub. No.: WO2022/087102
PCT Pub. Date: Apr. 28, 2022

(65) Prior Publication Data
US 2023/0383154 A1      Nov. 30, 2023

Related U.S. Application Data

(60) Provisional application No. 63/093,969, filed on Oct. 20, 2020.

(51) Int. Cl.
*C09J 5/00* (2006.01)
*C09J 167/03* (2006.01)

(52) U.S. Cl.
CPC .............. *C09J 5/00* (2013.01); *C09J 167/03* (2013.01); *C09J 2301/312* (2020.08)

(58) Field of Classification Search
CPC .. C09J 167/02; C09J 167/03; C09J 2301/302; C09J 2301/312; C09J 2467/00; C09J 5/00; C09J 7/38; B32B 2309/027; B32B 37/12; B29C 65/4825; Y02W 90/10; C08G 63/6886
USPC ........................................................ 156/332
See application file for complete search history.

(56) References Cited

U.S. PATENT DOCUMENTS

| 4,052,368 | A | * | 10/1977 | Larson | ....................... C09J 7/10 525/403 |
| 4,185,046 | A | * | 1/1980 | Pengilly | .................. C08L 67/02 428/458 |
| 5,171,308 | A | | 12/1992 | Gallagher et al. | |
| 6,713,595 | B2 | | 3/2004 | Chung et al. | |
| 7,220,815 | B2 | | 5/2007 | Hayes | |
| 10,513,643 | B2 | | 12/2019 | Zupancic et al. | |
| 2004/0024102 | A1 | | 2/2004 | Hayes et al. | |
| 2005/0027098 | A1 | * | 2/2005 | Hayes | ................ C08G 63/6886 528/272 |
| 2008/0306216 | A1 | | 12/2008 | Sommerfeld et al. | |
| 2009/0123767 | A1 | * | 5/2009 | Gohil | .................... B32B 27/285 428/458 |
| 2011/0092101 | A1 | | 4/2011 | Sick et al. | |
| 2013/0224692 | A1 | * | 8/2013 | Shukla | ..................... A61C 5/30 522/81 |
| 2014/0186568 | A1 | | 7/2014 | Kitagawa et al. | |
| 2019/0218437 | A1 | | 7/2019 | Hu et al. | |

FOREIGN PATENT DOCUMENTS

| EP | 1219694 A1 | | 7/2002 | |
| JP | S52155640 A | * | 12/1977 | .......... C08G 63/688 |
| JP | H0316728 A | * | 1/1991 | |
| JP | H0664308 A | | 3/1994 | |
| JP | H08253570 A | * | 10/1996 | |
| JP | H08295792 A | * | 11/1996 | |
| JP | H10204396 A | * | 8/1998 | |
| JP | 2010500728 A | * | 1/2010 | ............. C08J 5/121 |
| WO | WO2011062932 A1 | | 5/2011 | |
| WO | WO-2012126773 A1 | * | 9/2012 | ............ C09J 167/08 |

OTHER PUBLICATIONS

Ozturk et al. "Polyesters for Sustainable Adhesive Technologies" Sep. 1, 2011.*

* cited by examiner

*Primary Examiner* — John L Goff, II

(74) *Attorney, Agent, or Firm* — Christopher R. Lewis

(57) ABSTRACT

A method of adhering substrate surfaces to one another comprises applying a copolyester resin mixture to the surfaces and contacting the surfaces with one another in the absence of heat to form a cold seal. The copolyester resin may be sulfonated and the reaction product of (a) at least two diols comprising ethylene glycol at a mole fraction of at least about 0.25 and (b) at least three diacids or diesters comprising: (i) a sulfomonomer at a mole fraction of at least 0.02, preferably at least 0.07; (ii) at least one aromatic diacid or diester; and (iii) at least one aliphatic diacid or diester. The ratio of aromatic to aliphatic diacids or diesters may be between about 75/25 and about 45/55, and the glass transition temperature of the resin may be between about −25° C. and about 15° C. The resin may be solvated and preferably is food grade compliant and compostable.

16 Claims, No Drawings

AMORPHOUS COPOLYESTER RESINS FOR USE AS A COLD SEAL ADHESIVE, COATING COMPOSITIONS

This application is a national stage application under 35 U.S.C. § 371 of PCT/US2021/055804, filed Oct. 20, 2021, which claims benefit to U.S. patent application Ser. Nos. 63/093,969, filed Oct. 20, 2020, incorporated herein by reference.

This invention relates to methods of adhering substrate surfaces together in the absence of heat (i.e., using a cold seal adhesive). The invention also relates to copolyester resins and coating compositions incorporating the copolyester resins for application to substrate surfaces and adhering such substrate surfaces in the absence of heat. Such coating compositions are especially suitable for use to bond wrappers for food, consumer products, and medical devices.

BACKGROUND OF THE INVENTION

Circular economy is changing the way flexible packaging will develop and evolve in future. Within flexible packaging, sustainability has become a watchword. Sustainable solutions such as biodegradable, compostable, and recyclable packaging is gaining more interest in the flexible packaging industry. Any development will aim at improving or providing one of these key factors into the final product. Monomaterial packaging is one of the ways the market is leaning towards. This makes sorting and recycling or composting or biodegrading easier. Within sustainability, polyester (PET) technology is a clear building block for monomaterial packaging, due to its several benefits, which includes providing good moisture barrier and gas barrier properties. Adhesives for PET films are gaining more traction because of this changing market scenario.

An adhesive that could be used as a sealant should have adequate cohesive energy coming from within the polymer chains. Hence, a medium-to-high molecular weight copolyester would be a good choice to be used as an adhesive. Sealing can be performed in two ways, (1) either with heat or (2) without heat. A heat seal adhesive seals by the application of heat, pressure, and dwell time on the substrate that has the adhesive applied to it. Sealing can happen to the adhesive itself (self-seal) or it could be adhered to another substrate, like a tray stock, for instance. A cold seal adhesive is a self-seal adhesive, which possesses the ability to form a strong bond to itself when pressure is applied thereby forming a bond to the substrate on to which it is applied. Only mechanical energy is required to initiate sealing. No heat is required, and sealing is performed with minimal distortion. Cold seal is a part of pressure sensitive adhesives, which are soft enough to flow on to the adherend (also referred to herein as a substrate) and hard enough to resist flow when stress is applied.

An important commercial application for cold seal adhesives is food packaging for snacks such as candies, chocolates, and potato chips, which are sensitive to heat. Another desirable application is in packaging medical products as adhesives must provide a strong seal to maintain sterility but must be non-resealable. Any contamination of the flexible substrate containing the adhesive will interact with bond formation. So, adhesives having low blocking properties (or adhesives which can be used with overlacquers or release lacquers) are preferred.

Converted rolls of heat seal or cold seal adhesives should not be tacky or tend to block or should be able to be mixed with an anti-blocking agent. If blocking occurs, then the adhesive will adhere to the opposite face of flexible substrates on which it is coated. Hence, one must be mindful of the tackiness or blocking tendencies of these adhesives. Higher blocking of greater than 50 grams per linear inch (gli) at certain conditions is not ideal. If there is minimal or no blocking, then the flexible substrates with adhesives coated thereon could be desirably stored in roll form without sticking together, i.e. without blocking.

The prior art describes the use of natural rubber latex and acrylics to be used as a self-sealing adhesive that only sticks to itself (i.e., as a cold seal). This chemistry has been widely used for many decades to make confectionary packages. There is a desire to utilize alternative chemistries for a cold seal which potentially can be compostable. Such adhesives preferably adhere very well to polar substrates.

U.S. Pat. No. 6,221,448 discloses a cold seal composition which comprises 10 to 100% wt of at least one homogeneous ethylene/alpha-olefin interpolymer. This composition may be coated onto a variety of substrates, resists blocking upon being supplied as a roll, and exhibits a wide range of bond strengths.

U.S. Pat. No. 4,902,370 discloses synthetic based cold seal adhesives made from an acrylic copolymer or a styrene butadiene rubber as the base polymer and a styrene acrylic copolymer as the secondary polymers. The adhesive demonstrates no blocking, can be stored for extended periods of time, and can be used in place of natural rubber-based cold seal adhesives.

WO 2017/042178 discloses a cold seal adhesive based on aqueous polyurethane dispersions prepared with no catalyst or very low loading of organic catalyst.

U.S. Pat. No. 3,779,993 discloses water-dissipatable polyesters and polyamides that are made from a monomer containing a sulfonate group in the form of a metallic salt. The polyesters and polyamides are useful as adhesives and can be dissolved, dispersed, or otherwise dissipated in cold water, hot water, or aqueous solutions.

SUMMARY OF THE INVENTION

To date, the only types of technologies used for cold seal adhesives could be recycled, in some cases, but were not based on technology that is believed to be compostable. With the changes happening in the flexible packaging industry, a need exists to develop water based cold seal adhesives to replace the current technologies, but having the potential to be compostable. Newly developed copolyester resins may provide compostable cohesive cold seal adhesives possible. These copolyesters bond adequately to a variety of substrates, including polar substrates.

In order to meet at least some of the needs described herein and not met by various prior art references, the present invention provides a method of adhering a first substrate surface to a second substrate surface: applying a copolyester resin mixture to the first substrate surface and the second substrate surface; and contacting the first substrate surface with the second substrate surface to form a laminate, wherein the method is carried out at ambient temperature.

According to an embodiment of the invention, a composition comprises an amorphous copolyester resin comprising the reaction product of: (a) at least two diols comprising ethylene glycol at a mole fraction of at least about 0.25, preferably at least about and most preferably at least about 0.7 and at most about 0.97, preferably at most about and most preferably at most about 0.92 mole fraction based on the total amount of diols; and (b) at least three diacids or diesters comprising: (i) at least one sulfomonomer at a mole fraction based on the diacids or diesters of at least 0.02, preferably at least 0.03, more preferably at least 0.05, more preferably at least 0.07, preferably at least 0.08, and most preferably at least 0.09 and at most 0.2, more preferably at most 0.15, and most preferably at most 0.12; (ii) at least one aromatic diacid or diester; and (iii) at least one aliphatic diacid or diester, wherein the ratio of aromatic to aliphatic diacids or diesters is between about 75/25 and about 45/55, preferably between about 72/28 and about 48/52, more preferably between about 70/30 and about 50/50, and most preferably between about 68/32 and about 50/50 and the amorphous copolyester resin has a glass transition temperature between about −25° C. and about 15° C., preferably between about −18° C. and about 10° C., and most preferably between about −10° C. and about 5° C. or most preferably between about −20° C. and about −5° C. or between about −20° C. and about −5° C. In a preferred embodiment, ethylene gylcol is present in an amount from about 0.65 to 0.97, preferably from about 0.75 to about 0.95, and most preferably from about 0.80 to about 0.92 mole fraction based on the total amount of diols According to an embodiment of the invention, a composition comprises an amorphous copolyester resin comprising: (a) residues of at least two diols comprising ethylene glycol and (b) residues of at least three diacids or diesters comprising: (i) at least one sulfomonomer; (ii) at least one aromatic diacid or diester; and (iii) at least one aliphatic diacid or diester, wherein: (1) the copolyester resin has a bound mole fraction of the ethylene glycol residues of between about 0.5 to about 0.9, and most preferably at least about 0.65 to about 0.85 based on the diols; (2) the bound ratio of residues of aromatic to aliphatic diacids or diesters is between about 75/25 and about 45/55, preferably between about 72/28 and about 48/52, more preferably between about 70/30 and about 50/50, and most preferably between about 68/32 and about 50/50; and (3) the amorphous copolyester resin has a glass transition temperature between about −25° C. and about 15° C., preferably between about −18° C. and about According to another embodiment of the invention, a composition comprises an amorphous copolyester resin described above and a solvent, which may be selected from the group consisting of water, an organic solvent, or both.

DETAILED DESCRIPTION OF THE INVENTION

The present invention may be understood more readily by reference to the following detailed description of certain embodiments of the invention and the working examples.

The term "copolyester" is understood to mean a synthetic polymer prepared by the reaction of one or more difunctional carboxylic acids or esters (i.e., diacids or diesters) with one or more difunctional hydroxyl compounds (i.e., diols).

An embodiment of the invention provides a composition comprising an amorphous copolyester resin. As used herein, "amorphous" means a material that is essentially amorphous, such as having a heat of fusion of less than 5 Joules/gram, preferably less than 1 Joules/gram, and most preferably essentially zero Joules/gram. Heat of fusion values provided herein are determined according to ASTM E793-01 "Standard Test Method for Enthalpies of Fusion and Crystallization by Differential Scanning Calorimetry."

According to an embodiment of the invention directed to a method of adhering a first substrate surface to a second substrate surface, the method comprises applying a copolyester resin mixture to the first substrate surface and the second substrate surface; and contacting the first substrate surface with the second substrate surface to form a laminate, wherein the method is carried out at ambient temperature. In one embodiment, the substrate is a single substrate, and the first and second surfaces are different regions of that substrate. For example, the substrate could be a film used as a wrapper for food, such as candy, or consumer package goods, such as soap, feminine care products, and diapers. The two surfaces could be mating surfaces of the film which form seals of the wrapper, such as end seals. Alternatively, the first and second surfaces could be of two different substrates. The material of the substrates could vary over a wide range and include standard substrates, such as PET and metallized PET and compostable or biodgradable substrates, such as polylactic acid, polybutylene succinate (PBS), cellulose-based substrates, and polyhydroxy alkanoates (PHA). The substrate could be roll stock used for making a bag, pouch, or sachet. The machines used to make the sealed package could be any suitable machine or system, such as a horizontal form fill and seal machine or a vertical form fill and seal machine. A master roll of packaging could be produced at a first site, then slit into child rolls for use at copackers or brand owners. This is the final package that the consumer sees with the packaged food in it, ready to eat. In any event, the adhesive is applied to both surfaces and it functions as a cold seal adhesive, namely an adhesive that bonds to itself with pressure in the absence of heat.

The step of applying the copolyester resin mixture to the first substrate surface and the second substrate surface may be any suitable method. For example, the copolyester resin mixture may be applied to the first substrate surface and the second substrate surface in any known way, for example by immersion or dip coating, roll-coating, reverse roll coating, spraying, knife over-roll coating, air-knife coating, gravure application, gravure pattern application, or slot die processes. Similarly, contacting the first substrate surface with the second substrate surface to form a laminate can be done in any known manner, such as by applying pressure, optionally with serrated jaws. The contacting step is preferably done at a time and at a pressure sufficient to bond the first substrate surface to the second substrate surface. Preferably, the resulting bond has a bond strength sufficient to achieve an average of above 300 grams per linear inch (gli), as measured by the bond strength test as conducted on an Instron 5543 tensile tester following ASTM D903, at ambient conditions (25° C. and 50% RH), with a peel speed of 12 in/minutes. The lower and upper limits of the operable range would be 200 to 500 grams per linear inch (gli) and the lower and upper limits of the preferred range would be 300 to 400 grams per linear inch (gli). For clarity, according to this test, the bond is both formed and peeled at ambient conditions. In an embodiment of the invention, the time of the contacting step is from about 0.1 seconds to about 20 seconds, preferably from about 0.2 seconds to about 2 seconds, and the pressure of the contacting step is from about 40 psi to about 120 psi, preferably from about 60 psi to about 100 psi. Both the applying step and the contacting step are carried out at ambient temperature. As used herein, ambient temperature is about 25° C. As described in more detail below, the copolyester resin either be a single copolyester resin product or a blend of two or more copolyester resin products. In addition, the copolyester resin mixture could be a solution or a dispersion.

According to an embodiment of the invention, the copolyester resin is sulfonated. This means that the copolyester resin is the reaction product of monomers containing at least one sulfomonomer. The sulfomonomer is difunctional and is preferably a dicarboxylic acid or ester thereof containing a metal sulfonate group or a glycol containing a metal sulfonate group or a hydroxy acid containing a metal sulfonate group. The cation of the sulfonate salt can be $NH_4$, or a metal ion, such as $Li^+$, $Na^+$, $K^+$, $Mg^{++}$, $Ca^{++}$, $Cu^{++}$, $Ni^{++}$, $Fe^{++}$, $Fe^{+++}$. Preferred are monovalent cations, such as $NH_4^+$, $Li^+$, $Na^+$, and $K^+$, when stability in water is desired. Preferably, the sulfomonomer contains a —$SO_3M$ group attached to an aromatic nucleus, wherein M is hydrogen, $NH_4$, or a metal ion. The difunctional monomer component may be either a dicarboxylic acid or a diol adduct containing a —$SO_3M$ group. In preferred embodiments, the sulfomonomer is dimethyl 5-sulfoisophthalate sodium or 5-sulfoisophthalic acid.

According to an embodiment of the invention, the composition is a mixture of the copolyester resin and a solvent, and the solvent is selected from the group consisting of water, an organic solvent, or both. The blend of the resin and a solvent is referred to herein as a coating composition. As used herein, a solvent may contemplate a single solvent or a mixture of solvents. The solvent used will depend on the solubility characteristics of the coating composition prior to solvation and the end use. A wide range of solvents may be used, depending on these factors. The solvent, or solvent mixture, is preferably chosen to provide a coating composition with a suitable viscosity and solubilizes the copolyester resin with minimal heat and agitation. Preferably, the solvent is selected from the group consisting of acetone, isopropyl alcohol, tetrahydrofuran, and 1,3-dioxolane or mixtures thereof. In a preferred embodiment, the solvent is water and an organic solvent, and the organic solvent comprises a water-soluble organic solvent, such as acetone, isopropyl alcohol, or a mixture thereof. It has been found that acetone lowers the viscosity of the coating composition sufficiently. In a preferred embodiment, the solvent is present in an amount corresponding to a value of about 20 to 40% solids by weight, and the weight ratio of water:organic solvent (preferably isopropyl alcohol) is from about 80:20 to about 60:40. In another embodiment, the solvent consists of water.

According to an embodiment of the invention, the copolyester resin has an overall (average) glass transition temperature between about from about −25° C. to about 15° C., preferably between about −18° C. and about 10° C., and most preferably between about −10° C. and 5° C. or, in other embodiments, most preferably between about −20° C. and about −5° C. The glass transition temperature as described herein is measured using Differential Scanning calorimetry (DSC) according to ASTM E-794-01 except with one modification to the test in that a scanning temperature of 15° C. per minute instead of 10° C. per minute was used. When the copolyester resin is a single copolyester resin product (i.e, the copolyester resin formed from a single esterification or transesterification reaction scheme), then the overall (average) glass transition temperature is the glass transition temperature of that single copolyester resin product. When the copolyester resin is a blend of two or more single copolyester resin products, then the overall (average) glass transition temperature is weighted average of the glass transition temperature of copolyester resin products used to form the blend. For example, a blend of 75% by weight of a first copolyester resin product having a glass transition temperature of −20° C. and 25% by weight of a second copolyester resin product having a glass transition temperature of 20° C., the overall (average) glass transition temperature of the blend would be −10° C. This methodology is true for determining all properties of the copolyester resin used herein. Thus, one of the copolyester resin products used in a blended product might have a value outside of the desired range but, when combined with another copolyester resin product, the blend could be an inventive composition so long as the overall (average) value falls within the desired range.

The term "reaction product" as used herein refers to any product of an esterification or transesterification reaction of any of the monomers used in making the copolyester (i.e., the monomers charged to the reaction) or monomers formed in situ during the reaction including by an interaction of the monomers used, including an oligomer or the final copolyester, reacted to a certain acid number and or viscosity.

In an embodiment of the invention, the copolyester resin comprises the reaction product of: (a) at least two diols comprising ethylene glycol at a mole fraction of at least about preferably at least about 0.5, and most preferably at least about 0.7 based on the diols and at most about 0.97, preferably at most about 0.95, and most preferably at most about 0.92 mole fraction based on the total amount of diols; and (b) at least three diacids or diesters comprising: (i) at least one sulfomonomer at a mole fraction based on the diacids or diesters of at least 0.02, preferably at least 0.03, more preferably at least 0.05, more preferably at least more preferably at least 0.08, and most preferably at least 0.09 and at most 0.2, more preferably at most 0.15, and most preferably at most 0.12; (ii) at least one aromatic diacid or diester; and (iii) at least one aliphatic diacid or diester. In other embodiments, the at least one sulfomonomer is present at a mole fraction based on the diacids or diesters of at least 0.07, preferably at least 0.08, more preferably at least 0.09. In other embodiments the copolyester resin comprises the reaction product of: (a) at least two diols comprising ethylene glycol at a mole fraction of at least about 0.5, preferably at least about 0.6, more preferably at least about and most preferably at least about 0.75 based on the diols to at most about 0.95, more preferably at most about 0.9 and (b) at least three diacids or diesters comprising: (i) at least one sulfomonomer at a mole fraction based on the diacids or diesters of at least 0.02, preferably at least 0.03, more preferably at least 0.05, more preferably at least 0.07, more preferably at least and most preferably at least 0.09 and at most 0.2, more preferably at most 0.15, and most preferably at most 0.12; (ii) at least one aromatic diacid or diester; and (iii) at least one aliphatic diacid or diester. In a preferred embodiment, the ratio of aromatic to aliphatic diacids or diesters is between about 75/25 and about 45/55, preferably between about 72/28 and about 48/52, more preferably between about 70/30 and about 50/50, and most preferably between about 68/32 and about 50/50.

In a preferred embodiment, the monomers used may include the following:

a. at least one sulfomonomer selected from at least one of dimethyl-5-sulfoisophthalate sodium (DMSIP) or 5-sulfoisophalic acid (SIPA), preferably DMSIP;

b. at least one aliphatic diacid or diester selected from the group consisting of at least one of succinic acid, sebacic acid, azelaic acid, and adipic acid, preferably sebacic acid;

c. at least one aromatic diacid or diester is selected from the group consisting of at least one of isophthalic acid, dimethyl terephthalate, terephthalic acid, and dimethyl isophthalate, preferably isophthalic acid and dimethyl terephthalate; and d. at least two diols, one of which is ethylene glycol, and further comprising a second diol selected from the group consisting of at least one of neopentyl glycol, diethylene glycol, trimethylol propoane, and cyclohexane dimethanol, preferably neopentyl glycol.

It has been found that this combination of monomers balances the wide range of properties needed for some of the applications described herein. For use as a cold seal, the resin produced by these monomers provides the cohesive strength as described above. Moreover, the copolyester resin solvates easily at up to 40% solids in water and an organic solvent, such as isopropyl alcohol or acetone. In addition, the glass transition temperature is within the range desired for use as a cold seal adhesive.

In a preferred embodiment, the monomers used as charges to the reaction may include the following, in the following amounts:

a. dimethyl-5-sulfoisophthalate sodium in an amount from about at least 0.02, preferably at least 0.03, more preferably at least 0.05, more preferably 0.07 to about 0.2, preferably from about 0.08 to about 0.15, and most preferably from about 0.09 to about 0.12 mole fraction based on the total amount of diacids and diesters;

b. isophthalic acid is present in an amount from about 0.02 to 0.2, preferably from about 0.03 to about 0.15, and most preferably from about 0.05 to about mole fraction based on the total amount of diacids and diesters;

c. dimethyl terephthalate is present in an amount from about 0.25 to 0.55, preferably from about 0.3 to about 0.5, and most preferably from about 0.35 to about 0.45 mole fraction based on the total amount of diacids and diesters;

d. sebacic acid is present in an amount from about 0.18 to 0.4, preferably from about 0.2 to about 0.38, and most preferably from about 0.25 to about 0.35 mole fraction based on the total amount of diacids and diesters;

e. ethylene gylcol is present in an amount from about 0.65 to 0.97, preferably from about 0.75 to about 0.95, and most preferably from about 0.80 to about mole fraction based on the total amount of diols; and f. neopentyl gylcol is present in an amount from about 0.03 to 0.25, preferably from about 0.05 to about 0.2, and most preferably from about 0.08 to about mole fraction based on the total amount of diols.

g. optionally, diethylene glycol is present in an amount from about 0.01 to 0.2, preferably from about 0.01 to about 0.15, and most preferably from about 0.05 to 0.12 mole fraction based on the total amount of diols.

The mole fractions for each monomer are calculated by dividing the number of moles of the monomer added to the reaction by the total number of moles of monomers of that class (either diols on the one hand or diacids and diesters, on the other). In a preferred embodiment in which the above six or seven monomers are the only monomers used, the mole fractions of ethylene glycol, diethylene glycol (if added), and neopentyl glycol sum to one, and the mole fractions of dimethyl-5-sulfoisophthalate sodium salt, isophthalic acid, dimethyl terephthalate, and sebacic acid sum to one. The monomers used may comprise, consist essentially of, or consist of the six or seven monomers listed above. Unless otherwise noted herein, the mole fractions and ratios of monomers provided herein are of the relative amounts of monomers charged to the reaction. In some cases, when ethylene glycol is used, some amount of diethylene glycol is formed. Such diethylene glycol will also react in situ with a diacid or diester so that a residue of diethylene glycol forms part of the backbone of the copolyester. For example, in embodiments in which between about 0.8 and about 0.92 mole fraction of ethylene glycol is used, diethylene glycol may be formed in situ and become part of the copolyester backbone in an amount of about 0.07 to about 0.32, preferably between about 0.12 to about 0.25, with a corresponding decrease in the amount of ethylene glycol. The amount of diethylene glycol formed depends on the presence and amount of highly acidic acids and the conditions of the reaction (i.e., generally with increasing time and temperature of reaction, more diethylene glycol is formed). By purposely adding diethylene glycol to the charge, the amount of diethylene glycol residue being formed throughout the reaction may be more precisely controlled. For example, in embodiments in which between about 0.8 and 0.92 mole fraction of ethylene glycol combined with 0.05 to 0.15 mole fraction of diethylene glycol is used, diethylene glycol may be formed in situ and become part of the copolyester backbone as diethylene glycol residue in an amount of preferably between about 0.12 to 0.25 bound mole fraction, with a corresponding decrease in the amount of ethylene glycol, for example leading to about 0.65 and about 0.87 bound mole fraction of ethylene glycol residue.

In an embodiment, the diols used are mostly, substantially all, or all aliphatic. In a preferred embodiment, the diols comprise, consist essentially of, or consist of ethylene glycol and neopentyl glycol. Preferably, the molar ratio of ethylene glycol:neopentyl glycol is from about 3:1 to about 20:1, preferably between about 4:1 to about 15:1, more preferably between about 5:1 to about 12:1, and most preferably between about 7:1 and about 17:2. These ratios help the copolyester resin to achieve the suitable glass transition temperature desirable for the application described herein.

In another embodiment in which diethylene glycol also is used as a monomer charged to the reaction, the diols comprise, consist essentially of, or consist of ethylene glycol, diethylene glycol, and neopentyl glycol. Preferably, the molar ratio of ethylene glycol:diethylene glycol:neopentyl glycol is from about 3:1:1 to about 20:1:1, preferably between about 4:1:1 to about 15:1:1, more preferably between about 5:1:1 to about 12:1:1, and most preferably between about 7:1:1 and about 17:2:2. These ratios help the copolyester resin to achieve the suitable glass transition temperature desirable for the application described herein.

In an embodiment of the invention, the diacid and diester components include both aliphatic and aromatic monomers. As is known in making copolyester, either an acid or an ester may be used in combination with an alcohol to form the copolyester resin by an esterification reaction or a transesterification, respectively. Preferably, the ratio of aromatic to aliphatic diacids or diesters is between about 75/25 and about 45/55, preferably between about 72/28 and about 48/52, more preferably between about 70/30 and about 50/50, and most preferably between about 68/32 and about 50/50. This ratio provides a copolyester resin which was sufficiently tacky yet did not provide so much adhesive and cohesive strength to cause substrate failure or excessive blocking.

According to an embodiment of the invention, a composition comprises an amorphous copolyester resin comprising the reaction product of: (a) at least two diols comprising ethylene glycol at a mole fraction of at least about 0.25, preferably at least about 0.5, and most preferably at least about 0.7 based on the diols and (b) at least three diacids or diesters comprising: (i) at least one sulfomonomer at a mole fraction based on the diacids or diesters of at least 0.02, preferably at least 0.03, more preferably at least 0.05, more preferably at least 0.07, preferably at least 0.08, and most preferably at least 0.09 and at most 0.2, more preferably at most 0.15, and most preferably at most 0.12; (ii) at least one aromatic diacid or diester; and (iii) at least one aliphatic diacid or diester, wherein the ratio of aromatic to aliphatic diacids or diesters is between about 75/25 and about 45/55, preferably between about 72/28 and about 48/52, more preferably between about 70/30 and about 50/50, and most preferably between about 68/32 and about 50/50 and the amorphous copolyester resin has a glass transition temperature between about −25° C. and about 15° C., preferably between about −18° C. and about 10° C., and most preferably between about −10° C. and about 5° C., or, in other embodiments, most preferably between about −20° C. and about −5° C. Preferably, the composition further comprises a solvent, resulting in a mixture of the amorphous copolyester resin and the solvent. The form of the mixture may be a solution or a dispersion. The solvent is preferably selected from the group consisting of water, an organic solvent (such as acetone, isopropyl alcohol, tetrahydrofuran, and 1,3-dioxolane or mixtures thereof), or both. In a preferred embodiment, the solvent is a solvent mixture of water and an organic solvent, and, more preferably, the organic solvent is either acetone or isopropyl alcohol or a mixture thereof. Still more preferably, this solvent mixture of water and acetone/isopropyl alcohol is present in an amount corresponding to a value of about 20 to 40% solids by weight, and the weight ratio of water:organic solvent is from about 80:20 to about 60:40. The invention contemplates compositions which are compostable or not, methods using such compositions, and articles formed from such compositions.

As mentioned above, the mole fractions and ratios of monomers provided herein are of the relative amounts of monomers charged to the reaction unless otherwise noted. A mole fraction or ratio described herein as a bound mole fraction or bound ratio refers to that mole fraction or ratio of that residue that is part of the copolyester backbone. Thus, even though a particular embodiment might have no diethylene glycol used as a monomer charged to the reaction, if diethylene glycol is formed in situ and becomes part of the copolyester resin formed, then the copolyester resin may have a bound mole fraction of diethylene glycol residues above zero, such as between about 0.07 to about 0.32, and most preferably at least about 0.12 to about 0.25 based on the diols.

It is believed that embodiments of the present invention are compostable. The composting process uses microorganisms such as bacteria or fungi to break down the organic materials, the latter producing carbon dioxide, water, heat, and compost. It is important that microorganisms have a continuous supply of organics, water, and oxygen.

The standard methods for compostable testing are EN 13432 for packaging and ASTM 6400, which is a standard specification for compostable plastics. To be considered compostable, the product must demonstrate the three following items:

a. Disintegration: After starting with the product cut to 2 cm lengths, in 12 weeks of composting under laboratory controlled composting compositions 90% of the product must pass a 2 mm sieve.

b. Biodegradation: Sixty percent of the organic carbon must be converted to carbon dioxide by the end of the test period when compared to the positive control (cellulose).

c. No adverse effect on the quality of the compost: The germination rate and the plant biomass of the sample composts shall be no less than 90% and levels of heavy metals shall be less than certain standards, which depend on the regions.

Special conditions are required to perform this test. First, a temperature-controlled incubator is used to maintain a temperature of 58° C., the composting vessel (7.5 liters capacity) is split into two parts by use of a porous pad. The bottom part contains 1 liter of water and carbon dioxide is bubbled through this water to saturate the gas with water.

Inoculum: A 3-month-old compost is used; it is sieved through a 9.5 mm sieve and mixed. Ammonium chloride is added such that the C/N ratio is less than 15 and water volume is adjusted so that the moisture content is 50%.

Disintegration test: The test starts with 200 g of 2cm×2cm squares of the product, which are added to 1.2 kg of compost and put into the 7.5 liters vessel. The mixture is composted for 12 weeks; the vessel is shaken weekly to mix samples and compost and to prevent channeling. After 12 weeks, material is screened through a 2 mm sieve. No more than 10% of the original dry weight of the product can be retained on the sieve.

Biodegradation: This test is made with four mixes: Sample (log of the product and 600 g of compost), positive control (replacing the product by cellulose), a negative control (100 g of PET and 600 g of compost), and a blank (600 g of compost only).

The moisture content of the mixtures is adjusted to 50%. The composting vessels are placed in the incubator at 58° C.±2° C. The CO2 free air is then connected and adjusted so that the flow rate is between 150 and 200 ml per minute. The gases exiting the test chambers are plumbed to a solenoid valve, which is controlled to divert air for 2 minutes out of every 2 hours. These diverted gases flow into 1-liter adsorption units containing a known volume of 1N sodium hydroxide to adsorb the carbon dioxide being produced in the vessels (for the remainder to the 2 hours the exhaust is simply vented to the room). The sodium hydroxide is periodically titrated to measure the CO2 production; the standard days for the titration are 3, 7, 14, and every 7 days after that. Titration is made to pH 8.5 with 0.5N HC1 after adding BaCl2 to precipitate the carbonates formed by the CO2. Fresh 1N sodium hydroxide is placed in the absorption units and the whole process is repeated. The testing is carried out until the CO2 production from both the sample and the positive control have plateaued up to a maximum of 180 days.

Certain preferred embodiments of the copolyester resin of the present invention relate to the properties of the copolyester resin as formed. In one such embodiment, the amorphous copolyester resin has an acid number of less than 10 mg KOH/g, preferably less than 7 mg KOH/g but greater than 0.1 mg KOH/g, preferably greater than 1 mg KOH/g. The acid number as used herein is determined in accordance with DIN EN ISO 2114. The specimen to be investigated is dissolved in dichloromethane and methanol (80:20 volumetric blend) and titrated with 0.1 N sodium hydroxide solution in the presence of phenolphthalein. The acid number is the amount of milligrams of potassium hydroxide required to neutralize the acid present in one gram polymer. The acid number is a measure of the extent of reaction in forming the copolyester resin and decreases as the reaction progresses.

Number average molecular weight and weight average molecular weight were also determined using a size exclusion chromatography (SEC) using PMMA reference standards and DMSO as the solvent. The amorphous copolyester resin has a number average molecular weight (Mn) of between about 1000 to 15,000 daltons, preferably between about 5000 and 12,000 daltons, and a weight average molecular weight (Mw) of between about 7,000 to 45,000 daltons, preferably between about 15,000 to 40,000 daltons. In yet another embodiment of the invention, the amorphous copolyester resin has a Brookfield Thermosel melt viscosity at 215° C. of between 5,000 and 150,000 cP with a #27 spindle at rotational speed between about 0.5 and 10 rpm. In yet another embodiment of the invention, the intrinsic viscosity of the copolyester resin is between about 0.1 dl/g to about 0.7 dl/g, preferably between about 0.15 dl/g to about 0.55 dl/g. As used herein, intrinsic viscosity is determined in accordance with ASTM D5225-14. Both the molecular weight and the viscosity of the copolyester resin increase as the reaction progresses.

The copolyester used in the present invention may be produced by any conventional method for producing a copolyester by a transesterification method or a direct esterification method. However, in consideration of food applications, use of heavy metals or compounds that pose a problem in hygiene as catalysts and additives should be avoided or limited. The copolyesters used in the present invention typically can be prepared from diacids or diesters and diols which react in substantially equal proportions and are incorporated into the copolyester polymer as their corresponding residues. As is well-known, the diols are added in excess, because unreacted diols are more easily evaporated than unreacted diacids or diesters. The copolyesters of the present invention, therefore, can contain substantially equal molar proportions of diacid or diester residues and diol residues. The mole percentages provided in the present disclosure, therefore, may be based on the total moles of diacid and diester charges or the total moles of diol charges, except where noted as bound mole fractions or ratios.

Suitable methods include, but are not limited to, the steps of reacting one or more dicarboxylic acids with two or more diols at a temperature of 100° C. to 315° C. at a pressure of 0.1 to 760 mm Hg for a time sufficient to form a polyester. U.S. Pat. No. 3,772,405, incorporated herein by reference, describes suitable methods of producing copolyesters. In one process for making the copolyester resin, the process comprises: (I) heating a mixture comprising the selected monomers useful in any of the copolyesters of the invention in the presence of a catalyst at a temperature of 150 to 240° C. for a time sufficient to produce an initial polyester; (II) heating the initial polyester of step (I) at a temperature of 240 to 320° C. for 1 to 4 hours; and (III) removing any unreacted glycols.

Suitable catalysts for use in this process include, but are not limited to, organo-zinc, titanium, or tin compounds, although organo-tin compounds are not preferred for food and beverage applications. The use of this type of catalyst is well-known in the art. Examples of catalysts useful in the present invention include, but are not limited to, zinc acetate dihydrate, butyltin tris-2-ethylhexanoate, dibutyltin diacetate, titanium (IV) 2-ethylhexyloxide, titanium (IV) butoxide and/or dibutyltin oxide. Other catalysts may include, but are not limited to, those based on manganese, lithium, germanium, and cobalt. Catalyst amounts can range from 10 ppm to 20,000 ppm or 10 to 10,000 ppm, or to 5000 ppm or 10 to 1000 ppm or 10 to 500 ppm, or 10 to 300 ppm or 10 to 250 based on the catalyst metal and the weight of the final polymer. The process can be carried out in either a batch or continuous process.

According to a preferred embodiment of the invention, the copolyester resin is the reaction product of the following seven monomers present in the following molar ratios: ethylene glycol 0.09 diethylene glycol and 0.10 neopentyl glycol based on the total amount of glycols; and 0.41 sebacic acid, 0.39 dimethyl terephthalate, 0.1 DMSIP, and 0.1 isophthalic acid based on the total amount of diacids and diesters. In an embodiment, the copolyester resin is a resin made from a single esterification/transesterification scheme having these monomers in these relative amounts. In another embodiment, the copolyester resin is a blend of two or more resins, each made from its own esterification/transesterification scheme and each having a unique blend of monomers. In the embodiment of a blend, the two or more resins are selected to achieve a weighted average of properties or amounts of monomers as would be achieved for a resin made from a single esterification/transesterification scheme. For example, the copolyester resin may be a blend of a 35 wt. % of a first resin made from the following molar fractions of the following monomers: 0.67 ethylene glycol and 0.33 neopentyl glycol based on the total moles of diols and 0.54 dimethyl terephthalate, 0.08 isophthalic acid, 0.29 sebacic acid, and 0.1 DMSIP based on the total moles of diacids and diesters, and 65 wt % of a second resin made from the following molar fractions of the following monomers: only ethylene glycol on the diol side and 0.31 dimethyl terephthalate, 0.11 isophthalic acid, 0.48 sebacic acid, and 0.1 DMSIP.

Certain preferred aspects of this embodiment of the invention relate to the monomers used, and some not used, in making the copolyester resin. According to one such aspect, propane diol, butane diol, isopropyl alcohol, or both are not used in making the coplyester resin of the present invention. In other embodiments, no alcohol, such as ethanol, is used in the solvent mixture. In an embodiment of the invention, the copolyester resin (prior to solvation) is in the form of pellets. Alternative forms include granules, chopped rods, or powder.

The coating composition of the present invention may also include other optional ingredients that do not adversely affect the coating composition or a cured coating composition resulting therefrom. Such optional ingredients are typically included in a coating composition to enhance composition aesthetics, to facilitate manufacturing, processing, handling, and application of the composition, and to further improve a particular functional property of a coating composition or a cured coating composition resulting therefrom.

Such optional ingredients include, for example, dyes, pigments, toners, extenders, fillers, lubricants, anticorrosion agents, flow control agents, thixotropic agents, dispersing agents, antioxidants, adhesion promoters, light stabilizers, and mixtures thereof. Biocide for preventing water based product from microbial attack could also be added. Surfactants may also be used to improve dispersion and limit any phase separation. Defoamers and thickeners may also be used in known ways. Each optional ingredient is included in a sufficient amount to serve its intended purpose, but not in such an amount to adversely affect a coating composition or a cured coating composition resulting therefrom.

Another useful optional ingredient is a lubricant, like a wax, which facilitates manufacture of flexible metal substrates or a metallized paper by imparting lubricity to sheets of coated metal substrate. A lubricant is preferably present in the coating composition in an amount of about 0.01% to about 2%, and preferably about 0.1 to about 2%, by weight of nonvolatile material. Preferred lubricants include, for example, carnauba wax and polyethylene type lubricants.

In a preferred embodiment in which the cold seal adhesive is compostable, optional ingredients that are not compostable themselves are included in amounts of less than 1 wt %. Optional ingredients which themselves are compostable may be included in amounts of more than 1 wt % for the adhesive to still be characterized as compostable.

The invention further relates to articles of manufacture. The articles include wrappers, packaging, and food containers sealed together by a cold seal adhesive according to the present invention. The aforementioned coating compositions are particularly well adapted for use as a cold seal adhesive coating for use with a food wrapper, such as for candy.

According to an embodiment of the invention, the substrate comprises a film which has an adhesive according to the present invention coated on a first surface and the adhesive coated on a second surface, wherein the surfaces are sealed to one another. Preferably, the surfaces form seals of the film, such as end seals or longitudinal seals. The article could also comprise two or more substrates.

A way to minimize blocking is to include an overlacquer or release lacquer on the side of a substrate opposite the side on which the adhesive is coated. In this way, the overlacquer or release lacquer contacts the adhesive layer upon rolling a substrate and thereby inhibits blocking. The overlacquer or release lacquer could be any known overlacquer or release lacquer and can be applied in a conventional manner.

In another embodiment of the invention, the cold seal adhesive compositions described herein may be adhered to a release liner as a pressure sensitive adhesive, then applied to a substrate.

In embodiments in which multiple ranges or multiple lower limits and multiple upper limits are provided for a parameter, the invention includes any range from any lower limit to any upper limit for that parameter.

ASPECTS OF THE INVENTION

Aspect 1. A method of adhering a first substrate surface to a second substrate surface: applying a copolyester resin mixture to the first substrate surface and the second substrate surface; and
contacting the first substrate surface with the second substrate surface to form a laminate, wherein the method is carried out at ambient temperature.

Aspect 2. The method of aspect 1, wherein the copolyester resin is sulfonated.

Aspect 3. The method of aspects 1 or 2, wherein the contacting step is done at a time and at a pressure sufficient to bond the first substrate surface to the second substrate surface.

Aspect 4. The method of aspect 3, wherein the time of the contacting step is from about 0.1 seconds to about 20 seconds, preferably from about 0.2 seconds to about 2 seconds, and the pressure of the contacting step is from about 40 psi to about 120 psi, preferably from about 60 psi to about 100 psi.

Aspect 5. The method of any of aspects 1-4, wherein the composition is a mixture of the copolyester resin and a solvent and the solvent is selected from the group consisting of water, an organic solvent, or both.

Aspect 6. The method of aspect 5, wherein the solvent is water and an organic solvent, and the organic solvent comprises acetone and isopropyl alcohol.

Aspect 7. The method of aspect 6, wherein the solvent is present in an amount corresponding to a value of about 20 to 40% solids by weight, and the weight ratio of water: organic solvent is from about 80:20 to about 60:40.

Aspect 8. The method of any of aspects 1-7, wherein the overall Tg of the copolyester resin is from about −25° C. to about 15° C., preferably between about −18° C.

and about 10° C., and most preferably between about −10° C. and 5° C. or between about −20° C. and about −5° C.

Aspect 9. The method of any of aspects 1-8, wherein the copolyester resin comprises the reaction product of: (a) at least two diols comprising ethylene glycol at a mole fraction of at least about 0.25, preferably at least about 0.5, and most preferably at least about 0.7 based on the diols and (b) at least three diacids or diesters comprising: (i) at least one sulfomonomer at a mole fraction based on the diacids or diesters of at least 0.02, preferably at least 0.03, more preferably at least 0.05, more preferably at least 0.07, more preferably at least 0.08, and most preferably at least 0.09 and at most 0.2, more preferably at most 0.15, and most preferably at most 0.12; (ii) at least one aromatic diacid or diester; and (iii) at least one aliphatic diacid or diester.

Aspect 10. The method of aspect 9, wherein the ratio of aromatic to aliphatic diacids or diesters is between about 75/25 and about 45/55, preferably between about 72/28 and about 48/52, more preferably between about 70/30 and about 50/50, and most preferably between about 68/32 and about 50/50.

Aspect 11. The method of aspects 9 or 10, wherein:
the at least one sulfomonomer is at least one of dimethyl-5-sulfoisophthalate sodium salt (DIMSIP) or 5-sulfoisophalic acid (SIPA);
the at least one aliphatic diacid or diester is selected from the group consisting of sebacic acid, azelaic acid, and adipic acid;
the at least one aromatic diacid or diester is selected from the group consisting of at least one of isophthalic acid, dimethyl terephthalate, terephthalic acid, and dimethyl isophthalate; and
the at least two diols further comprise at least one of neopentyl glycol, diethylene glycol, trimethylol propoane, and cyclohexane dimethanol.

Aspect 12. The method of aspect 11, wherein:
the at least one sulfomonomer is dimethyl-5-sulfoisophthalate sodium salt;
the at least one aliphatic diacid or diester is sebacic acid;
the at least one aliphatic diacid or diester is isophthalic acid and dimethyl terephthalate; and
the at least two diols are ethylene glycol and neopentyl glycol.

Aspect 13. The method of aspect 12, wherein: dimethyl-5-sulfoisophthalate sodium salt is present in an amount from about 0.07 to 0.2, preferably from about 0.08 to about 0.15, and most preferably from about 0.09 to about 0.12 mole fraction based on the total amount of diacids and diesters;
isophthalic acid is present in an amount from about 0.02 to 0.2, preferably from about 0.03 to about 0.15, and most preferably from about 0.05 to about 0.1 mole fraction based on the total amount of diacids and diesters;
dimethyl terephthalate is present in an amount from about 0.25 to 0.55, preferably from about to about 0.5, and most preferably from about 0.35 to about 0.45 mole fraction based on the total amount of diacids and diesters;
sebacic acid is present in an amount from about 0.18 to 0.4, preferably from about 0.2 to about and most preferably from about 0.25 to about 0.35 mole fraction based on the total amount of diacids and diesters;
ethylene gylcol is present in an amount from about 0.75 to 0.97, preferably from about 0.8 to about 0.95, and most preferably from about 0.85 to about 0.92 mole fraction based on the total amount of diols; and neopentyl gylcol is present in an amount from about 0.03 to 0.25, preferably from about 0.05 to about 0.2, and most preferably from about 0.08 to about 0.15 mole fraction based on the total amount of diols.

Aspect 14. The method of any of aspects 9-13, wherein the diols are mostly, substantially all, or all aliphatic.

Aspect 15. The method of aspects 12 or 13, wherein molar ratio of ethylene glycol:neopentyl glycol is from about 3:1 to about 20:1, preferably between about 4:1 to about more preferably between about 5:1 to about 12:1, and most preferably between about 7:1 and about 17:2.

Aspect 16. A composition comprising an amorphous copolyester resin comprising the reaction product of: (a) at least two diols comprising ethylene glycol at a mole fraction of at least about 0.25, preferably at least about 0.5, and most preferably at least about 0.7 based on the diols and (b) at least three diacids or diesters comprising: (i) at least one sulfomonomer at a mole fraction based on the diacids or diesters of at least 0.02, preferably at least 0.03, more preferably at least 0.05, more preferably at least 0.07, preferably at least 0.08, and most preferably at least 0.09; (ii) at least one aromatic diacid or diester; and (iii) at least one aliphatic diacid or diester, wherein the ratio of aromatic to aliphatic diacids or diesters is between about 75/25 and about 45/55, preferably between about 72/28 and about 48/52, more preferably between about 70/30 and about 50/50, and most preferably between about 68/32 and about 50/50 and the amorphous copolyester resin has a glass transition temperature between about −25° C. and about 15° C., preferably between about −18° C. and about 10° C., and most preferably between about −10° C. and about 5° C. or most preferably between about −20° C. and about −5° C.

Aspect 17. The composition of aspect 16 further comprising a solvent.

Aspect 18. The composition of aspect 17, wherein the solvent is selected from the group consisting of water, an organic solvent, or both.

Aspect 19. The composition of aspect 18, wherein the solvent is water and an organic solvent, and the organic solvent comprises acetone and isopropyl alcohol.

Aspect 20. The composition of aspect 19, wherein the solvent is present in an amount corresponding to a value of about 20 to 40% solids by weight, and the weight ratio of water:organic solvent is from about 80:20 to about 60:40.

Aspect 21. The composition of any of aspects 16–20, wherein: the at least one sulfomonomer is at least one of dimethyl-5-sulfoisophthalate sodium salt (DMSIP) or 5-sulfoisophalic acid (SIPA);

the at least one aliphatic diacid or diester is selected from the group consisting of sebacic acid, azelaic acid, and adipic acid;

the at least one aromatic diacid or diester is selected from the group consisting of at least one of isophthalic acid, dimethyl terephthalate, terephthalic acid, and dimethyl isophthalate; and the at least two diols further comprise at least one of neopentyl glycol, diethylene glycol, trimethylol propoane, and cyclohexane dimethanol.

Aspect 22. The composition of aspect 21, wherein:

the at least one sulfomonomer is dimethyl-5-sulfoisophthalate sodium salt;

the at least one aliphatic diacid or diester is sebacic acid;

the at least one aliphatic diacid or diester is isophthalic acid and dimethyl terephthalate; and the at least two diols are ethylene glycol and neopentyl glycol.

Aspect 23. The composition of aspect 22, wherein:

dimethyl-5-sulfoisophthalate sodium is present in an amount from at least 0.02, preferably at least 0.03, more preferably at least 0.05, more preferably at least about 0.07 to 0.2, preferably from about 0.08 to about 0.15, and most preferably from about 0.09 to about 0.12 mole fraction based on the total amount of diacids and diesters;

isophthalic acid is present in an amount from about 0.02 to 0.2, preferably from about 0.03 to about 0.15, and most preferably from about 0.05 to about 0.1 mole fraction based on the total amount of diacids and diesters;

dimethyl terephthalate is present in an amount from about 0.25 to 0.55, preferably from about to about 0.5, and most preferably from about 0.35 to about 0.45 mole fraction based on the total amount of diacids and diesters;

sebacic acid is present in an amount from about 0.18 to 0.4, preferably from about 0.2 to about 0.38, and most preferably from about 0.25 to about 0.35 mole fraction based on the total amount of diacids and diesters;

ethylene gylcol is present in an amount from about 0.75 to 0.97, preferably from about 0.8 to about 0.95, and most preferably from about 0.85 to about 0.92 mole fraction based on the total amount of diols; and neopentyl gylcol is present in an amount from about 0.03 to 0.25, preferably from about 0.05 to about 0.2, and most preferably from about 0.08 to about 0.15 mole fraction based on the total amount of diols.

Aspect 24. The composition of any of aspects 16-23, wherein the diols are mostly, substantially all, or all aliphatic.

Aspect 25. The composition of any of aspects 22 or 23, wherein molar ratio of ethylene glycol:neopentyl glycol is from about 3:1 to about 20:1, preferably between about 4:1 to about more preferably between about 5:1 to about 12:1, and most preferably between about 7:1 and about 17:2.

Aspect 26. The composition of any of aspects 16 to 24, wherein diethylene glycol is present in an amount from about 0.01 to about 0.2, preferably from about 0.01 to about 0.15, and most preferably from about 0.05 to about 0.12 mole fraction based on the total amount of diols.

Aspect 27. The laminate formed by the method of aspect 1.

Aspect 28. An article comprising at least one substrate having a first surface and a second surface mated with one another and each having a composition of any of aspects 16-26 coated thereon.

Aspect 28. An article comprising a first substrate having a first surface and a second substrate having a second surface, wherein each of the first and second surface are mated with one another and each has a composition of any of aspects 16-26 coated thereon.

Aspect 29. A composition comprising an amorphous copolyester resin comprising: (a) residues of at least two diols comprising ethylene glycol and (b) residues of at least three diacids or diesters comprising: (i) at least one sulfomonomer; (ii) at least one aromatic diacid or diester; and (iii) at least one aliphatic diacid or diester, wherein:

the copolyester resin has a bound mole fraction of the ethylene glycol residues of between about 0.5 to about 0.9, and most preferably at least about 0.65 to about 0.85 based on the diols;

the bound ratio of residues of aromatic to aliphatic diacids or diesters is between about 75/25 and about 45/55, preferably between about 72/28 and about 48/52, more preferably between about 70/30 and about 50/50, and most preferably between about 68/32 and about 50/50; and the amorphous copolyester resin has a glass transition temperature between about −25° C. and about 15° C., preferably between about −18° C. and about 10° C.

Aspect 30. The composition of aspect 29, wherein the copolyester resin has a bound mole fraction of the diethylene glycol residues of between about 0.07 to about 0.32, and most preferably at least about 0.12 to about 0.25 based on the diols.

Aspect 31. The composition of aspect 28 or 28, wherein the copolyester resin has a bound mole fraction of the at least one sulfomonomer in an amount from at least 0.02, preferably at least 0.03, more preferably at least 0.05, more preferably at least about 0.07 to 0.2, preferably from about 0.08 to about 0.15, and most preferably from about 0.09 to about 0.12 mole fraction based on the total amount of diacids and diesters.

EXAMPLES

The following examples demonstrate several aspects of certain preferred embodiments of the present invention, and are not to be construed as limitations thereof.

Example 1

To a 2 liter glass flask was added dimethyl terephthalate, (403.67 grams), ethylene glycol (469.50 grams), and zinc acetate dihydrate (0.588 grams). The reaction mixture was stirred and heated to 204° C. under a slow nitrogen purge. After reaching 204° C. the reaction mixture was stirred for about 1.5 hours with a slight nitrogen purge, until the distillation temperature at the top of the column dropped below 60° C. About 100 grams of a colorless distillate was collected over this heating cycle. At this point to the flask was added isophthalic acid (118.82 grams), ethylene glycol (153.26 grams), 5-sodioisophthalic acid (179.25 grams), sebacic acid (651.59 grams), and germanium dioxide (0.279 grams). The reaction mixture was then heated to 200° C. over 0.4 hours with stirring under a slow nitrogen purge. The resulting reaction mixture was held at 200° C. under a slight nitrogen purge for about 2 hours, or until the distillation temperature at the top of the column dropped below 90° C. The reaction mixture was then heated to 255° C. over 1.5 hours with stirring under a slight nitrogen purge. About 120 grams of a colorless distillate was collected over this heating cycle. At this point to the flask was added ethylene glycol (124.85 grams) and p-toluenesulfonic acid (0.01 grams), and allowed to mix for 30 minutes. The reaction mixture was then staged to full vacuum with stirring at 255° C. The resulting reaction mixture was stirred for 2 hours under full vacuum, (pressure less than 5 ton). The vacuum was then released with nitrogen and the reaction mass was transferred to a PTFE tray and allowed to cool to room temperature. About an additional 250 grams of distillate was recovered and 1.35 kilograms of a solid product was recovered. A sample of the product was calculated to have an inherent viscosity, (IV), of 0.53 dL/g. The sample also underwent differential scanning calorimetry, (DSC), analysis. A glass transition temperature (Tg) was observed at −22.83° C.

Example 2

To a 2 liter glass flask was added dimethyl terephthalate, (403.67 grams), dimethyl-5-sulfoisophthalate sodium salt (198.00 grams), ethylene glycol (469.50 grams), and zinc acetate dihydrate (0.588 grams). The reaction mixture was stirred and heated to 204° C. under a slow nitrogen purge. After reaching 204° C. the reaction mixture was stirred for about 1.5 hours with a slight nitrogen purge, until the distillation temperature at the top of the column dropped below 60° C. About 140 grams of a colorless distillate was collected over this heating cycle. At this point to the flask was added isophthalic acid (118.82 grams), ethylene glycol (153.26 grams), sebacic acid (651.59 grams), and germanium dioxide (0.279 grams). The reaction mixture was then heated to 200° C. over 0.4 hours with stirring under a slow nitrogen purge. The resulting reaction mixture was held at 200° C. under a slight nitrogen purge for about 2 hours, or until the distillation temperature at the top of the column dropped below 90° C. The reaction mixture was then heated to 255° C. over 1.5 hours with stirring under a slight nitrogen purge. About 120 grams of a colorless distillate was collected over this heating cycle. At this point to the flask was added ethylene glycol (124.85 grams) and p-toluenesulfonic acid (0.01 grams), and allowed to mix for 30 minutes. The reaction mixture was then staged to full vacuum with stirring at 255° C. The resulting reaction mixture was stirred for 2.5 hours under full vacuum, (pressure less than 20 torr). The vacuum was then released with nitrogen and the reaction mass was transferred to a PTFE tray and allowed to cool to room temperature. About an additional 285 grams of distillate was recovered and 1.30 kilograms of a solid product was recovered. A sample of the product was calculated to have an inherent viscosity, (IV), of 0.44 dL/g. The sample also underwent differential scanning calorimetry, (DSC), analysis. A glass transition temperature (Tg) was observed at −23.09° C.

Example 3

To a 2 liter glass flask was added dimethyl terephthalate, (300.60 grams), dimethyl-5-sulfoisophthalate sodium salt (195.97 grams), ethylene glycol (464.67 grams), and zinc acetate dihydrate (0.588 grams). The reaction mixture was stirred and heated to 204° C. under a slow nitrogen purge. After reaching 204° C. the reaction mixture was stirred for about 1.5 hours with a slight nitrogen purge, until the distillation temperature at the top of the column dropped below 60° C. About 110 grams of a colorless distillate was collected over this heating cycle. At this point to the flask was added isophthalic acid (117.60 grams), ethylene glycol (151.69 grams), sebacic acid (743.90 grams), and germanium dioxide (0.279 grams). The reaction mixture was then heated to 200° C. over 0.4 hours with stirring under a slow nitrogen purge. The resulting reaction mixture was held at 200° C. under a slight nitrogen purge for about 2 hours, or until the distillation temperature at the top of the column dropped below 90° C. The reaction mixture was then heated to 255° C. over 1.5 hours with stirring under a slight nitrogen purge. About 130 grams of a colorless distillate was collected over this heating cycle. At this point to the flask was added ethylene glycol (123.57 grams) and p-toluenesulfonic acid (0.01 grams), and allowed to mix for 30 minutes. The reaction mixture was then staged to full vacuum with stirring at 255° C. The resulting reaction mixture was stirred for 2.5 hours under full vacuum, (pressure less than 20 torr). The vacuum was then released with nitrogen and the reaction mass was transferred to a PTFE tray and allowed to cool to room temperature. About an additional 280 grams of distillate was recovered and 1.27 kilograms of a solid product was recovered. A sample of the product was calculated to have an inherent viscosity, (IV), of 0.35 dL/g. The sample also underwent differential scanning calorimetry, (DSC), analysis. A glass transition temperature (Tg) was observed at −34.7° C. as well as a melt transition (Tm) at 94.5° C.

Example 4

To a 2 liter glass flask was added dimethyl terephthalate, (674.14 grams), dimethyl-5-sulfoisophthalate sodium salt (191.86 grams), ethylene glycol (307.26 grams), neopentyl glycol (249.37 grams), germanium dioxide (0.28 grams), Irganox 1010 (5.20 grams), and zinc acetate dihydrate (0.56 grams). The reaction mixture was stirred and heated to 204° C. under a slow nitrogen purge. After reaching 204° C. the reaction mixture was stirred for about 1.5 hours with a slight nitrogen purge, until the distillation temperature at the top of the column dropped below 60° C. About 230 grams of a colorless distillate was collected over this heating cycle. At this point to the flask was added isophthalic acid (89.93 grams), ethylene glycol (131.68 grams), sebacic acid (374.64 grams), and neopentyl glycol (106.87 grams). The reaction mixture was then heated to 200° C. over 0.4 hours with stirring under a slow nitrogen purge. The resulting reaction mixture was held at 200° C. under a slight nitrogen purge for about 2 hours, or until the distillation temperature at the top of the column dropped below 90° C. The reaction mixture was then heated to 255° C. over 1.5 hours with stirring under a slight nitrogen purge. About 70 grams of a colorless distillate was collected over this heating cycle. The reaction mixture was then staged to full vacuum with stirring at 255° C. The resulting reaction mixture was stirred for 2.5 hours under full vacuum, (pressure less than 20 torr). The vacuum was then released with nitrogen and the reaction mass was transferred to a PTFE tray and allowed to cool to room temperature. About an additional 275 grams of distillate was recovered and 1.31 kilograms of a solid product was recovered. A sample of the product was calculated to have an inherent viscosity, (IV), of 0.30 dL/g. The sample also underwent differential scanning calorimetry, (DSC), analysis. A glass transition temperature (Tg) was observed at 20.36° C.

Example 5

To a 2 liter glass flask was added dimethyl terephthalate, (686.32 grams), dimethyl-5-sulfoisophthalate sodium salt (195.33 grams), ethylene glycol (312.82 grams), neopentyl glycol (253.88 grams), germanium dioxide (0.28 grams), Irganox 1010 (5.20 grams), and zinc acetate dihydrate (0.56 grams). The reaction mixture was stirred and heated to 204° C. under a slow nitrogen purge. After reaching 204° C. the reaction mixture was stirred for about 1.5 hours with a slight nitrogen purge, until the distillation temperature at the top of the column dropped below 60° C. About 230 grams of a colorless distillate was collected over this heating cycle. At this point to the flask was added isophthalic acid (85.45 grams), ethylene glycol (134.06 grams), azelaic acid (354.95 grams), and neopentyl glycol (108.80 grams). The reaction mixture was then heated to 200° C. over 0.4 hours with stirring under a slow nitrogen purge. The resulting reaction mixture was held at 200° C. under a slight nitrogen purge for about 2 hours, or until the distillation temperature at the top of the column dropped below 90° C. The reaction mixture was then heated to 255° C. over 1.5 hours with stirring under a slight nitrogen purge. About 70 grams of a colorless distillate was collected over this heating cycle. The reaction mixture was then staged to full vacuum with stirring at 255° C. The resulting reaction mixture was stirred for 2.25 hours under full vacuum, (pressure less than 20 torr). The vacuum was then released with nitrogen and the reaction mass was transferred to a PTFE tray and allowed to cool to room temperature. About an additional 285 grams of distillate was recovered and 1.30 kilograms of a solid product was recovered. A sample of the product was calculated to have an inherent viscosity, (IV), of 0.30 dL/g. The sample also underwent differential scanning calorimetry, (DSC), analysis. A glass transition temperature (Tg) was observed at 18.38° C.

Example 6

To a 2 liter glass flask was added dimethyl terephthalate, (725.65 grams), dimethyl-5-sulfoisophthalate sodium salt (206.52 grams), ethylene glycol (330.74 grams), neopentyl glycol (268.43 grams), germanium dioxide (0.28 grams), Irganox 1010 (5.20 grams), and zinc acetate dihydrate (0.56 grams). The reaction mixture was stirred and heated to 204° C. under a slow nitrogen purge. After reaching 204° C. the reaction mixture was stirred for about 1.5 hours with a slight nitrogen purge, until the distillation temperature at the top of the column dropped below 60° C. About 240 grams of a colorless distillate was collected over this heating cycle. At this point to the flask was added isophthalic acid (138.82 grams), ethylene glycol (141.75 grams), adipic acid (291.39 grams), and neopentyl glycol (115.04 grams). The reaction mixture was then heated to 200° C. over 0.4 hours with stirring under a slow nitrogen purge. The resulting reaction mixture was held at 200° C. under a slight nitrogen purge for about 2 hours, or until the distillation temperature at the top of the column dropped below 90° C. The reaction mixture was then heated to 255° C. over 1.5 hours with stirring under a slight nitrogen purge. About 80 grams of a colorless distillate was collected over this heating cycle. The reaction mixture was then staged to full vacuum with stirring at 255° C. The resulting reaction mixture was stirred for 2 hours under full vacuum, (pressure less than 20 torr). The vacuum was then released with nitrogen and the reaction mass was transferred to a PTFE tray and allowed to cool to room temperature. About an additional 290 grams of distillate was recovered and 1.29 kilograms of a solid product was recovered. A sample of the product was calculated to have an inherent viscosity, (IV), of 0.27 dL/g. The sample also underwent differential scanning calorimetry, (DSC), analysis. A glass transition temperature (Tg) was observed at 13.61° C.

Example 7

To a 2 liter glass flask was added dimethyl terephthalate, (499.57 grams), dimethyl-5-sulfoisophthalate sodium salt (195.41 grams), ethylene glycol (441.85 grams), neopentyl glycol (95.39 grams), Irganox 1010 (5.20 grams), and zinc acetate dihydrate (0.56 grams). The reaction mixture was stirred and heated to 204° C. under a slow nitrogen purge. After reaching 204° C. the reaction mixture was stirred for about 1.5 hours with a slight nitrogen purge, until the distillation temperature at the top of the column dropped below 60° C. About 180 grams of a colorless distillate was collected over this heating cycle. At this point to the flask was added isophthalic acid (106.31 grams), ethylene glycol (189.36 grams), sebacic acid (550.99 grams), neopentyl glycol (40.88 grams), and germanium dioxide (0.28 grams). The reaction mixture was then heated to 200° C. over 0.4 hours with stirring under a slow nitrogen purge. The resulting reaction mixture was held at 200° C. under a slight nitrogen purge for about 2 hours, or until the distillation temperature at the top of the column dropped below 90° C. The reaction mixture was then heated to 255° C. over 1.5 hours with stirring under a slight nitrogen purge. About 110 grams of a colorless distillate was collected over this heating cycle. The reaction mixture was then staged to full vacuum with stirring at 255° C. The resulting reaction mixture was stirred for 3 hours under full vacuum, (pressure less than 5 torr). The vacuum was then released with nitrogen and the reaction mass was transferred to a PTFE tray and allowed to cool to room temperature. About an additional 275 grams of distillate was recovered and 1.34 kilograms of a solid product was recovered. A sample of the product was calculated to have an inherent viscosity, (IV), of 0.44 dL/g. The sample also underwent differential scanning calorimetry, (DSC), analysis. A glass transition temperature (Tg) was observed at −18.1° C.

Example 8

To a 2 liter glass flask was added dimethyl terephthalate, (441.92 grams), dimethyl-5-sulfoisophthalate sodium salt (195.44 grams), ethylene glycol (441.92 grams), neoptentyl glycol (95.41 grams), Irganox 1010 (5.20 grams), and zinc acetate dihydrate (0.60 grams). The reaction mixture was stirred and heated to 204° C. under a slow nitrogen purge. After reaching 204° C. the reaction mixture was stirred for about 1.5 hours with a slight nitrogen purge, until the distillation temperature at the top of the column dropped below 60° C. About 170 grams of a colorless distillate was collected over this heating cycle. At this point to the flask was added isophthalic acid (106.32 grams), ethylene glycol (189.39 grams), sebacic acid (551.08 grams), and neopentyl glycol (40.88 grams). The reaction mixture was then heated to 200° C. over 0.4 hours with stirring under a slow nitrogen purge. The resulting reaction mixture was held at 200° C. under a slight nitrogen purge for about 2 hours, or until the distillation temperature at the top of the column dropped below 90° C. The reaction mixture was then heated to 255° C. over 1.5 hours with stirring under a slight nitrogen purge. About 105 grams of a colorless distillate was collected over this heating cycle. The reaction mixture was then staged to full vacuum with stirring at 255° C. The resulting reaction mixture was stirred for 2.5 hours under full vacuum, (pressure less than 5 ton). The vacuum was then released with nitrogen and the reaction mass was transferred to a PTFE tray and allowed to cool to room temperature. About an additional 300 grams of distillate was recovered and 1.34 kilograms of a solid product was recovered. A sample of the product was calculated to have an inherent viscosity, (IV), of 0.41 dL/g. The sample also underwent differential scanning calorimetry, (DSC), analysis. A glass transition temperature (Tg) was observed at −18.3° C.

Example 9

To a 2 liter glass flask was added dimethyl terephthalate, (662.73 grams), dimethyl-5-sulfoisophthalate sodium salt (198.23 grams), ethylene glycol (360.39 grams), neoptentyl glycol (432.43 grams), Irganox 1010 (1.47 grams), tetra-n-butyl titanate (0.264 grams), and zinc acetate dihydrate (0.499 grams). The reaction mixture was stirred and heated to 204° C. under a slow nitrogen purge. After reaching 204° C. the reaction mixture was stirred for about 1.5 hours with a slight nitrogen purge, until the distillation temperature at the top of the column dropped below 60° C. About 230 grams of a colorless distillate was collected over this heating cycle. At this point to the flask was added isophthalic acid (433.59 grams), ethylene glycol (90.10 grams), and neopentyl glycol (114.95 grams). The reaction mixture was then heated to 200° C. over 0.4 hours with stirring under a slow nitrogen purge. The resulting reaction mixture was held at 200° C. under a slight nitrogen purge for about 2 hours, or until the distillation temperature at the top of the column dropped below 90° C. The reaction mixture was then heated to 255° C. over 1.5 hours with stirring under a slight nitrogen purge. About 80 grams of a colorless distillate was collected over this heating cycle. The reaction mixture was then staged to full vacuum with stirring at 255° C. The resulting reaction mixture was stirred for 2 hours under full vacuum, (pressure less than 5 ton). The vacuum was then released with nitrogen and the reaction mass was transferred to a PTFE tray and allowed to cool to room temperature. About an additional 380 grams of distillate was recovered and 1.29 kilograms of a solid product was recovered. A sample of the product was calculated to have an inherent viscosity, (IV), of 0.25 dL/g. The sample also underwent differential scanning calorimetry, (DSC), analysis. A glass transition temperature (Tg) was observed at 56.1° C.

Example 10

To a 2 liter glass flask was added dimethyl terephthalate, (647.66 grams), dimethyl-5-sulfoisophthalate sodium salt (290.58 grams), ethylene glycol (352.20 grams), neopentyl glycol (422.60 grams), Irganox 1010 (1.47 grams), tetra-n-butyl titanate (0.264 grams), and zinc acetate dihydrate (0.499 grams). The reaction mixture was stirred and heated to 204° C. under a slow nitrogen purge. After reaching 204° C. the reaction mixture was stirred for about 1.5 hours with a slight nitrogen purge, until the distillation temperature at the top of the column dropped below 60° C. About 245 grams of a colorless distillate was collected over this heating cycle. At this point to the flask was added isophthalic acid (369.41 grams), ethylene glycol (88.05 grams), and neopentyl glycol (112.34 grams). The reaction mixture was then heated to 200° C. over 0.4 hours with stirring under a slow nitrogen purge. The resulting reaction mixture was held at 200° C. under a slight nitrogen purge for about 2 hours, or until the distillation temperature at the top of the column dropped below 90° C. The reaction mixture was then heated to 255° C. over 1.5 hours with stirring under a slight nitrogen purge. About 70 grams of a colorless distillate was collected over this heating cycle. The reaction mixture was then staged to full vacuum with stirring at 255° C. The resulting reaction mixture was stirred for 2 hours under full vacuum, (pressure less than 5 ton). The vacuum was then released with nitrogen and the reaction mass was transferred to a PTFE tray and allowed to cool to room temperature. About an additional 380 grams of distillate was recovered and 1.30 kilograms of a solid product was recovered. A sample of the product was calculated to have an inherent viscosity, (IV), of 0.23 dL/g. The sample also underwent differential scanning calorimetry, (DSC), analysis. A glass transition temperature (Tg) was observed at 58.1° C.

Example 11

To a 2 liter glass flask was added dimethyl terephthalate, (476.62 grams), dimethyl-5-sulfoisophthalate sodium salt (186.43 grams), ethylene glycol (339.17 grams), neopentyl glycol (73.23 grams), diethylene glycol (93.50 grams) Irganox 1010 (5.2 grams), and zinc acetate dihydrate (0.56 grams). The reaction mixture was stirred and heated to 204° C. under a slow nitrogen purge. After reaching 204° C. the reaction mixture was stirred for about 1.5 hours with a slight nitrogen purge, until the distillation temperature at the top of the column dropped below 60° C. About 145 grams of a colorless distillate was collected over this heating cycle. At this point to the flask was added isophthalic acid (101.42 grams), sebacic acid (525.68 grams), ethylene glycol (145.36 grams), neopentyl glycol (31.38 grams), and germanium dioxide (0.28 grams). The reaction mixture was then heated to 200° C. over 0.4 hours with stirring under a slow nitrogen purge. The resulting reaction mixture was held at 200° C. under a slight nitrogen purge for about 2 hours, or until the distillation temperature at the top of the column dropped below 90° C. The reaction mixture was then heated to 255° C. over 1.5 hours with stirring under a slight nitrogen purge. About 135 grams of a colorless distillate was collected over this heating cycle. The reaction mixture was then staged to full vacuum with stirring at 255° C. The resulting reaction mixture was stirred for 2.25 hours under full vacuum, (pressure less than 5 ton). The vacuum was then released with nitrogen and the reaction mass was transferred to a PTFE tray and allowed to cool to room temperature. About an additional 70 grams of distillate was recovered and 1.30 kilograms of a solid product was recovered. A sample of the product was calculated to have an inherent viscosity, (IV), of 0.41 dL/g. The sample also underwent differential scanning calorimetry, (DSC), analysis. A glass transition temperature (Tg) was observed at –15.49° C.

1-H NMR spectroscopy was conducted on the copolyester resin formed by several of the previous examples and the following Table 1 shows the resulting diol residues recorded. As the 1-H NMR was performed in CDCl$_3$, accurate results of the diacid content could not be obtained.

TABLE 1

| COPOLYESTER | IV (dL/g) | Tg (° C.) | EG | NPG | DEG |
| --- | --- | --- | --- | --- | --- |
| EXAMPLE 1 | 0.53 | –22.83 | 0.757 | — | 0.243 |
| EXAMPLE 2 | 0.44 | –23.09 | 0.748 | — | 0.252 |
| EXAMPLE 3 | 0.35 | –34.7 | 0.772 | — | 0.228 |
| EXAMPLE 7 | 0.44 | –18.1 | 0.576 | 0.126 | 0.297 |
| EXAMPLE 8 | 0.41 | –18.3 | 0.556 | 0.127 | 0.316 |
| EXAMPLE 11 | 0.41 | –15.49 | 0.638 | 0.078 | 0.284 |

Although some of the copolyester resins formed above in each example have glass transition temperatures outside of the optimal ranges, one could easily envision how two or more such resins could be combined to form a blend having an overall (average) glass transition temperature within the optimal ranges. As one example, a blend having 65 wt % of the resin from Example 1 and 35 wt % of the resin from Example 4 would have an overall (average) Tg of about –8° C.

A composition of Example 8 was dispersed in water to 30% solids at 97° C. then cooled to room temperature and applied to two surfaces of two different substrates: 92 gauge PET or metallized PLA. The surfaces of the respective substrates were bonded to form a PET-cold seal-PET laminate and a PLA-cold seal-PLA laminate under the following conditions: 80psi, 0.5sec, 72° F., 50%RH, and serrated jaws. The bond strength was determined by the bond strength test conducted on an Instron 5543 tensile tester following ASTM D903, at ambient conditions (25° C. and 50% RH), with a peel speed of 12 in/minutes. The results were 614 gli for the standard 92 gauge PET laminate and 536 gli for the PLA laminate.

We claim:

1. A method of adhering a first substrate surface to a second substrate surface: applying a copolyester resin mixture to the first substrate surface and the second substrate surface; and contacting the first substrate surface with the second substrate surface to form a laminate, wherein the method is carried out at ambient temperature, wherein the first substrate and the second substrate are compostable substrates, wherein a copolyester resin in the copolyester resin mixture comprises the reaction product of: (a) at least two diols comprising ethylene glycol at a mole fraction of at least about 0.25 based on the diols and neopentyl glycol and the molar ratio of ethylene glycol: neopentyl glycol is from about 3:1 to about 20:1 and (b) at least three diacids or diesters comprising: (i) at least one sulfomonomer at a mole fraction based on the diacids or diesters of at least 0.02; (ii) at least one aromatic diacid or diester; and (iii) at least one aliphatic diacid or diester.

2. The method of claim 1, wherein the contacting step is done at a time and at a pressure sufficient to bond the first substrate surface to the second substrate surface.

3. The method of claim 2, wherein the time of the contacting step is from about 0.1 seconds to about 20 seconds, and the pressure of the contacting step is from about 40 psi to about 120 psi.

4. The method of claim 1, wherein the copolyester resin mixture further comprises a solvent and the solvent is water, an organic solvent, or both.

5. The method of claim 4, wherein the solvent is water and an organic solvent, and the organic solvent comprises acetone and isopropyl alcohol.

6. The method of claim 1, wherein the overall Tg of the copolyester resin is from about –25° C. to about 15° C.

7. The method of claim 1, wherein: the at least one sulfomonomer is at least one of dimethyl-5-sulfoisophthalate sodium salt (DMSIP) or 5-sulfoisophthalic acid (SIPA); the at least one aliphatic diacid or diester is selected from the group consisting of sebacic acid, azelaic acid, and adipic acid; the at least one aromatic diacid or diester is selected from the group consisting of at least one of isophthalic acid, dimethyl terephthalate, terephthalic acid, and dimethyl isophthalate; and the at least two diols further comprise at least one of diethylene glycol, trimethylol propane, and cyclohexane dimethanol.

8. The method of claim 1, wherein the ratio of aromatic to aliphatic diacids or diesters is between about 75/25 and about 45/55.

9. The method of claim 8, wherein the ratio of aromatic to aliphatic diacids or diesters is between about 70/30 and about 50/50.

10. The method of claim 1, wherein: the at least one sulfomonomer is dimethyl-5-sulfoisophthalate sodium salt; the at least one aliphatic diacid or diester is sebacic acid; and the at least one aromatic diacid or diester is isophthalic acid and dimethyl terephthalate.

11. The method of claim 10, wherein: dimethyl-5-sulfoisophthalate sodium salt is present in an amount from about 0.07 to 0.2 mole fraction based on the total amount of diacids and diesters; isophthalic acid is present in an amount from about 0.02 to 0.2 mole fraction based on the total amount of diacids and diesters; dimethyl terephthalate is present in an amount from about 0.25 to 0.55 mole fraction based on the total amount of diacids and diesters; sebacic acid is present in an amount from about 0.18 to 0.4 mole fraction based on the total amount of diacids and diesters;

ethylene gylcol is present in an amount from about 0.75 to 0.97 mole fraction based on the total amount of diols; and neopentyl gylcol is present in an amount from about 0.03 to 0.25 mole fraction based on the total amount of diols.

12. The method of claim 11, wherein: dimethyl-5-sulfoisophthalate sodium salt is present in an amount from about 0.08 to about 0.15 mole fraction based on the total amount of diacids and diesters; isophthalic acid is present in an amount from about 0.03 to about 0.15 mole fraction based on the total amount of diacids and diesters; dimethyl tere-phthalate is present in an amount from about 0.3 to about 0.5 mole fraction based on the total amount of diacids and diesters;

sebacic acid is present in an amount from about 0.2 to about 0.38 mole fraction based on the total amount of diacids and diesters; ethylene gylcol is present in an amount from about 0.8 to about 0.95 mole fraction based on the total amount of diols; and neopentyl gylcol is present in an amount from about 0.05 to about 0.2 mole fraction based on the total amount of diols.

13. The method of claim 1, wherein the at least two diols further comprise diethylene glycol present in an amount from about 0.01 to about 0.2 mole fraction based on the total amount of diols.

14. The method of claim 1, wherein the copolyester resin mixture comprises a blend of two or more copolyester products.

15. A method of adhering a first substrate surface to a second substrate surface: applying an amorphous sulfonated copolyester resin mixture, comprising the reaction product of: (a) at least two diols comprising ethylene glycol at a mole fraction and (b) at least three diacids or diesters comprising: (i) at least one sulfomonomer; (ii) at least one aromatic diacid or diester; and (iii) at least one aliphatic diacid or diester, to the first substrate surface and the second substrate surface; and contacting the first substrate surface with the second substrate surface to form a laminate, wherein the method is carried out at ambient temperature, wherein the first substrate and the second substrate are compostable substrates and an amorphous sulfonated copolyester resin in the amorphous sulfonated copolyester resin mixture has a Tg of between about −25° C. and about 15° C.

16. The method of claim 15, wherein the amorphous sulfonated copolyester resin mixture comprises a blend of two or more copolyester products.

* * * * *